Dec. 13, 1955  R. O. FREDERIKSEN  2,726,636
DEMAND DELIVERY WATERING DEVICE
FOR DOMESTIC HOUSE ANIMALS
Filed Feb. 11, 1955  3 Sheets-Sheet 1
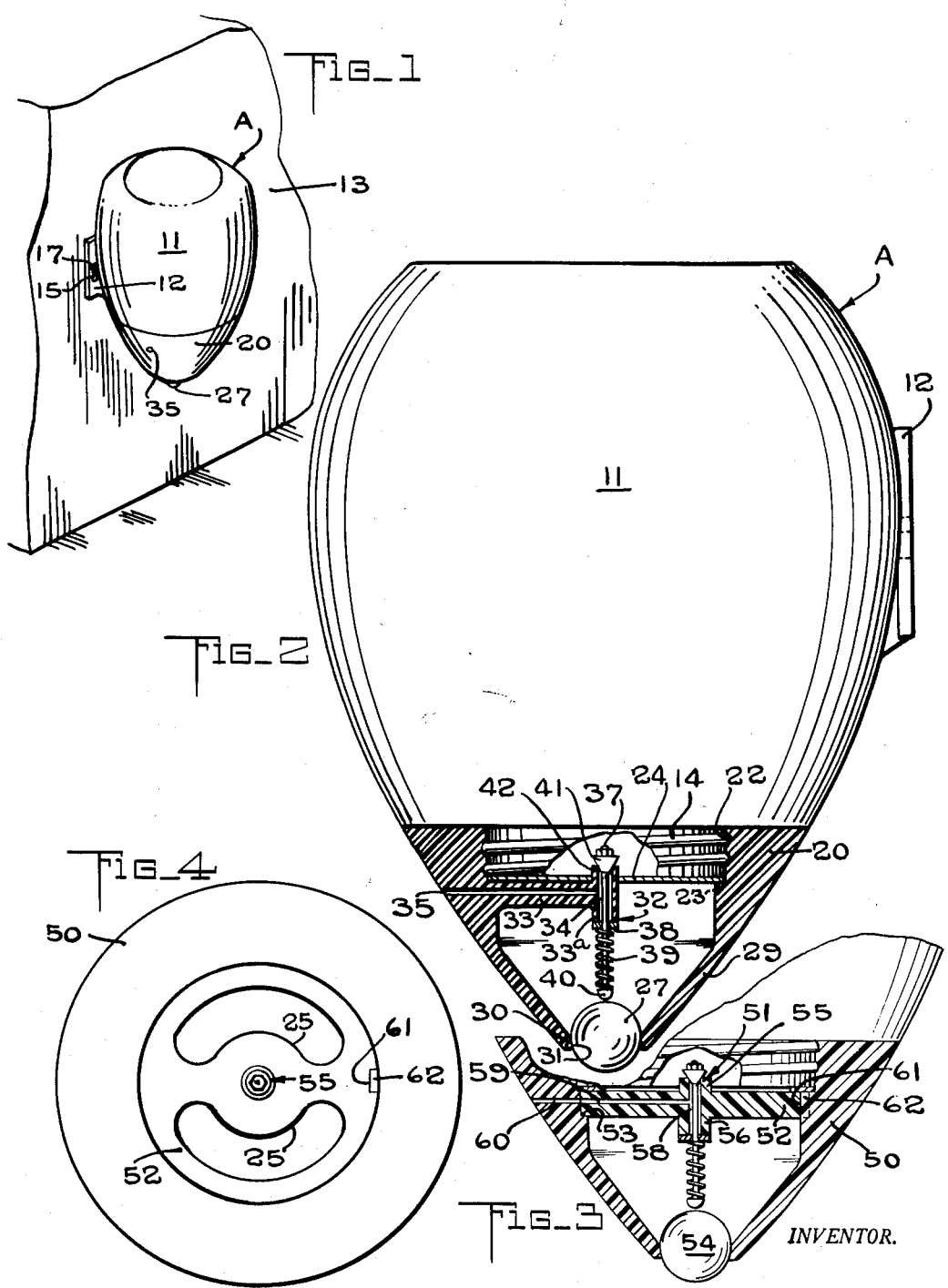
INVENTOR.
ROBERT O. FREDERIKSEN
BY Hansen and Lane
ATTORNEYS

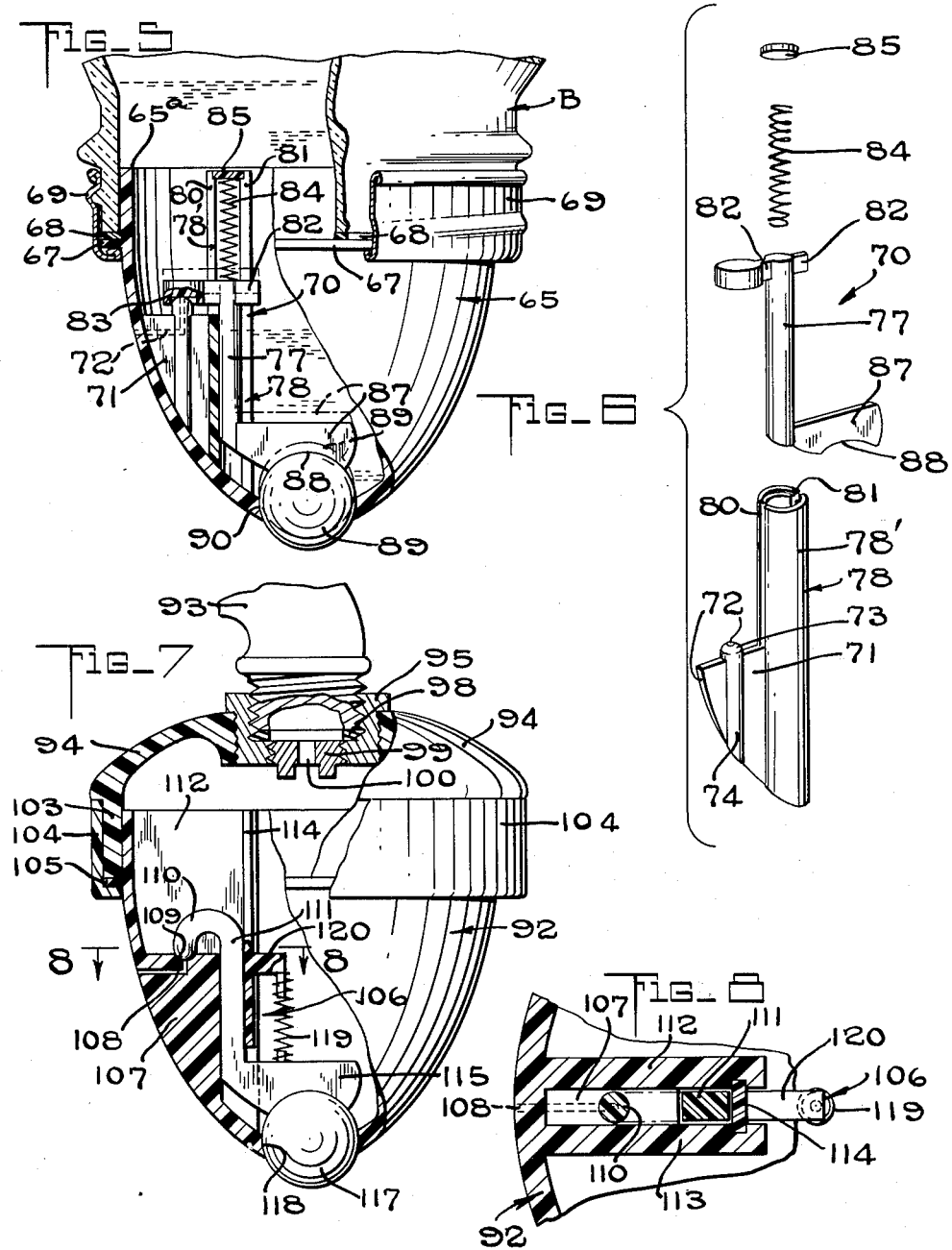

Dec. 13, 1955 R. O. FREDERIKSEN 2,726,636
DEMAND DELIVERY WATERING DEVICE
FOR DOMESTIC HOUSE ANIMALS
Filed Feb. 11, 1955 3 Sheets-Sheet 3
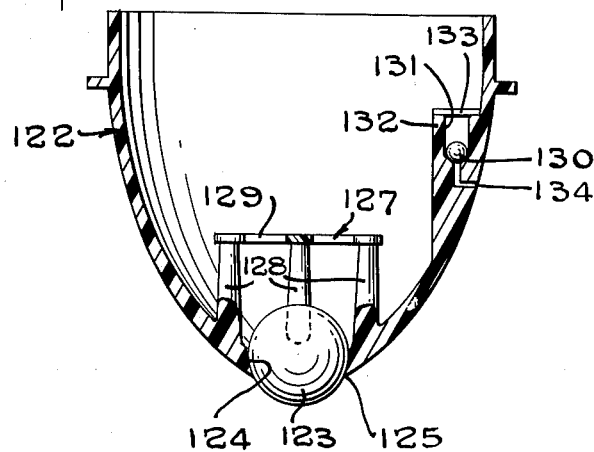
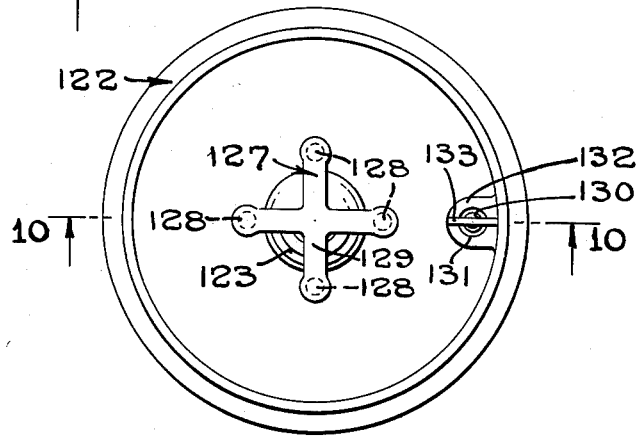
INVENTOR.
ROBERT O. FREDERIKSEN
BY
Hansen and Lane
ATTORNEYS

United States Patent Office 2,726,636
Patented Dec. 13, 1955

2,726,636

DEMAND DELIVERY WATERING DEVICE FOR DOMESTIC HOUSE ANIMALS

Robert O. Frederiksen, Mountain View, Calif.

Application February 11, 1955, Serial No. 487,542

11 Claims. (Cl. 119—72.5)

The present invention relates to a tongue-operated drinking device for domestic house animals such as dogs and cats.

In my Patent No. 2,678,630, issued May 18, 1954, there is disclosed a drinking device of the same general character as that which comprises the subject matter of the present application.

The present invention contemplates the pr vision of an improved and simplified drinking device for domestic house animals.

The invention also provides an improved drinking device with an easily refillable, gravity-feed container, and including means for properly venting the device upon discharge of a supply of water therefrom to facilitate use by the animals and to avoid air lock and gurgling noises which might tend to disturb or frighten an animal drinking from the device.

These and other objects and advantages of the invention will be apparent from the following description and the accompanying drawings, wherein—

Fig. 1 is a perspective view of one embodiment of the invention as it appears when mounted on a wall ready for use.

Fig. 2 is an enlarged side view of the fountain shown in Fig. 1, the upper part being shown in elevation and the lower part being shown sectionally along a vertical mid plane.

Fig. 3 is a view similar to the lower portion of Fig. 2 but showing a modified form of vented valve stem support.

Fig. 4 is a plan view of the cap portion of the structure shown in Fig. 3, as it appears when removed from the container portion.

Fig. 5 is a view, partly in side elevation and partly in section, showing a cap embodying a modified form of the invention mounted on a jar of the conventional home fruit jar type, the upper portion of the jar being broken away.

Fig. 6 is an enlarged, exploded view of the valve stem and its mounting assembly as shown in Fig. 5.

Fig. 7 is a view similar to Fig. 5 but showing a further modified form of the invention mounted on a hose bibb, portions being broken away.

Fig. 8 is an enlarged fragmentary sectional view taken along line 8—8 of Fig. 7.

Fig. 9 is a plan view of a further modified form of the invention.

Fig. 10 is a sectional view taken along line 10—10 of Fig. 9.

Referring first to the form of the invention shown in Figs. 1 and 2, an animal's drinking fountain A consists of a liquid containing portion 11 which may be molded of suitable plastic material such as a hard styrene. A supporting bracket 12 may be molded integrally with the container portion 11 for mounting the device on a wall 13. The container 11 preferably is of smoothly rounded conformation and is provided with an externally threaded neck portion 14 on its lower end which preferably is threaded externally similarly to the neck portion of the well known glass preserving jars of the type commonly known as "Mason" jars.

The mounting bracket 12 has a pair of inverted keyhole slots 15 therein, one thereof being provided on each side of the bracket 12, for receiving screws 17 threadedly inserted in the wall 13. By fitting the enlarged lower portions of the keyhole slots 15 over the heads of the screws 17, and sliding the container 11 downwardly to bring the shanks of the screws into the smaller upper portions of the slots 15 the bracket may be removably attached to the wall.

A cap 20 may also be molded of suitable plastic material, and, like the container 11, should be of sufficient strength and hardness to withstand biting by the class of animals for which it is intended. The cap 20 preferably is of tapered exterior conformation in the form of a curved, inverted conoid, as best shown in Fig. 2. The slope of the external wall of the cap preferably is such that when an animal attempts to chew on the cap portion 20 its teeth will be cammed downwardly off the cap.

An internally threaded cylindrical recess 22 is provided in the upper end of the cap 20, its internal diameter and thread size being such as to screw onto the threaded neck portion 14 of the container 11. Below the threaded recess 22 is formed an offset shoulder 23, and a combined sealing and ball-retaining gasket disk 24 of water-proof sheet material which may be of suitable plastic or of waterproof gasket material is fitted therein with a light press fit. The gasket disk 24 is provided with a pair of arcuate holes therein, similar to the holes 25 (Fig. 4) in a modified form of disk to be described later herein.

The arcuate openings in the gasket disk 24 are of a width less than the diameter of a valve ball 27 to prevent the ball from passing from the cap 20 into the container 11 during handling and shipping of the device.

Below the gasket supporting shoulder 23, the wall of the cap tapers, and its lower portion 29 is of substantially uniform thickness. An outlet opening 30 is provided in the lower end of the cap 20 and the valve ball 27, of a specific gravity greater than that of water, is seated in a seat 31 formed marginally around the outlet. A stainless steel bearing ball of the type used in ball bearings has been found suitable for this purpose.

For venting the device, and preventing air-lock, a vent valve 32 is mounted in the free inner end of an arm 33 which projects radially inwardly from the wall of the cap 20 (Fig. 2).

A cylindrical end portion 33a is formed on the inner end of the arm 33, and a bore 34 is provided therethrough which is co-axial with the cap 20 itself. The bore 34 communicates with the atmosphere exteriorly of the cap through a radial vent passage 35 which extends through the arm 33 and the side of the cap. A valve stem 37 of substantially smaller diameter than the axial bore 34 is slidably mounted with a sealed fit in a washer 38, which may be of rubber or nylon, and is held in sealing relation against the lower end of the end portion 33a by the pressure of a light valve spring 39 which encircles the valve stem 37 and is held in compression between the washer 38 and a rivet-type head 40 formed on the lower end of the valve stem.

This arrangement permits an in-flow of venting air through the vent passage 35 and thence upwardly between the valve stem 37 and the wall of the bore 34 when a tapered valve head 41 on the upper end of the valve stem 37 is raised from its seat 42 surrounding the upper end of the bore 34. The light coil spring 39 urges the valve stem 37 gently downwardly to seat the valve head 41, and the valve ball 27 on their respective seats.

In placing the drinking device A in use, the entire device may be removed from its supported position on the wall 13 (Fig. 1) by raising it slightly to center the screws 17 in the enlarged lower portions of the keyhole slots 15. The cap 20 then may be unscrewed from the container portion 11, and the latter filled with water. The cap then may be screwed back onto the container, the gasket disk 24 preventing the valve ball 27 from leaving the cap 20, in the event it should become displaced from beneath the riveted end portion 40 of the valve stem 37. The device A then may be re-attached to the wall, ready for use as shown in Fig. 1.

In teaching an animal to drink from the device, it is advisable to fill the container 11 the first time with a liquid of which the animal is especially fond, such as milk or boullion. Raising the ball 27 from its seat with one's finger will release a quantity of the liquid through the outlet opening 30 onto one's finger, and at the same time will raise the valve head 41 from its seat, thereby venting the container 11 by admitting air through the vent passage 35.

When the ball 27 is released, it again gravitates back onto its seat, aided by the spring 39, and cuts off the flow of water, at the same time closing the vent valve 41. After thus operating the device, the animal may be allowed to lick one's finger which has been wetted by the liquid released from the device, and then may be encouraged to lick the exposed lower portion of the ball 27. This releases the liquid onto the animal's tongue. After using the device a few times, the animal soon learns to tilt its head upwardly as it licks the ball so as to catch all of the liquid released by the device.

In the modified form of the invention shown in Figs. 3 and 4, a cap 50 and vent valve 51 are generally similar to the corresponding parts of Fig. 2. Instead of the vent arm 33 of Fig. 2 however, a disk 52 is provided and is made of suitable material, for example, hard, molded plastic.

The disk 52 is fitted into a seat 53 provided therefor in the cap 50, and has the arcuate openings 25 therein, referred to previously herein, to allow liquid from the container 11 to flow freely into the cap 50, and to retain the valve ball 54 in the cap.

Round central bosses 55 and 56 are formed on the upper and lower sides, respectively, of the disk 52, and an axial bore 58 is provided through the disk similar to the bore 34 of Fig. 2. The vent valve 51 is mounted in this bore similarly to the valve 41 in Fig. 2, and functions in the same manner. The disk 52 is provided with a radial vent passage 59 which is aligned with a vent passage 60 in the cap 50 by a notch 61 on one side of the disk, into which is fitted a correspondingly shaped key 62 formed integrally with the side of the seat 53 in which the disk is mounted.

The valve ball 54 is mounted in the cap 50 and operates the vent valve 51 in the same manner as explained previously herein for the ball 27 of Fig. 2.

In the modified form of the invention shown in Figs. 5 and 6, a cap 65 is generally similar to the cap 20 of Fig. 2. The open upper end 65a of the cap 65, however, is of a diameter to fit within the mouth of a conventional fruit jar B, and has a surrounding radial flange 67 formed integrally thereon. A sealing washer 68 is interposed between the flange 67 and the end of the fruit jar, and the parts are secured together by a threaded ring 69 of the type commonly employed on fruit jars for retaining their usual sealing caps thereon.

The vent valve 70 illustrated in Figs. 5 and 6 is supported on the inner edge of an upright radial wall 71 which extends radially inwardly from the wall of the cap 65. A vent passage 72 extends from the center of a domed boss 73 on the upper edge of the wall 71, through the wall and communicates with the atmosphere exteriorly of the cap 65. Ridges 74 (Fig. 6) extend down the sides of the wall from the boss 63 to facilitate withdrawing the cap from a mold in accordance with usual molding practice.

The vent valve 70 comprises a stem 77, mounted for free axial movement in a tubular guide portion 78 formed integrally on the radially inward edge of the wall 71. The tubular guide portion 78 extends upwardly at 78' a substantial distance above the upper end of the wall 71, and is slotted at 80 and 81 on diametrically opposite sides thereof to receive a cross head portion 82 of the valve stem 77 slidably therein. The cross head portion 82 is guided by the sides of the slots 80 and 81 against rotative displacement. The cross head portion extends over the domed boss 73 and is provided with a resilient sealing insert 83 (Fig. 5) for seating on the boss 73 and sealing the vent passage 72.

A light coil spring 84 is mounted in the tubular guide portion 78 above the valve stem 77, and is held lightly in compression between the valve stem 77 and a disk 85 secured, as by suitable adhesive in the upper end of the tubular guide portion 78.

A laterally extending ball-engaging arm 87 is secured to the lower end of the valve stem 77 and is slidably mounted in the lower portion of slot 81 which extends lengthwise the entire length of the tubular guide portion 78. An arcuate notch 88 is provided in the bottom of the ball engaging arm 87 to fit over the valve ball 89 and urge it toward its seat 90.

In the further modified form of the invention shown in Figs. 7 and 8, a cap 92 generally similar to the cap 65 illustrated in Fig. 5 is provided. For mounting the device on a water hose bibb 93 or other suitable source of piped, pressurized water, and upper body portion 94 is provided having an interiorly threaded metal insert 95 incorporated integrally therewith. A conventional garden-hose-type sealing washer 98 is mounted in the insert 95 for sealing the device to the hose bibb 93. A flow reducing plug 99 may be screwed into a threaded opening provided therefor in the inner end of the insert 95, and a small orifice 100 is provided centrally of the plug 99. When using a high pressure source of water, the plug 99 may be inserted to reduce the flow of water into the cap. When using the device on a low pressure source of water, the plug may be removed.

The upper body portion 94 is provided with a cylindrical bottom flange 103 which fits closely over the open upper end of the cap 92. A sealing ring 104 also may be fitted with a light press fit over the bottom flange 103 and against the under side of a radial flange 105 on the cap 92, similar to the flange 67 of the cap 65 of Fig. 5. These interfitted parts may be sealed together by a suitable adhesive, since ordinarily it will not be necessary to separate them during the life of the device.

A vent valve 106 is mounted on the inner edge of an upright radial wall portion 107 having a vent passage 108 therethrough communicating with the atmosphere. The wall 107 is recessed at 109 around the upper end of the vent passage to provide a seat for the goose-neck shaped end portion 110 of a valve stem 111.

A pair of parallel wall portions 112 and 113 for guiding the valve stem 111 and preventing rotative displacement thereof extend upwardly on opposite sides of the valve stem 111, and are spaced apart sufficiently to allow free vertical movement of the valve stem therebetween.

A valve stem retaining strip 114 is fitted into grooves provided therefor near the radially inward edges of the parallel guide wall portions 112 and 113, and terminates a sufficient distance above a radially inwardly extending ball-engaging arm 115 to allow free operative displacement of the valve ball 117 from its seat 118.

A light coil spring 119 is held in compression between the ball engaging arm 115 and an abutment 120 on the valve retaining strip 114 to urge the vent valve 106 toward closed position and the outlet valve ball 117 downwardly toward its seat.

In the form of the invention shown in Figs. 9 and 10, a cap 122 is generally similar to the cap 65 of Fig. 5, with the exception that it has no radially disposed upright wall. A valve ball 123 is seated in a seat 124 provided therefor marginally around an outlet opening 125 similarly to the outlet valve balls of the other forms of the invention described previousy herein. The ball 123 is enclosed in a cage 127 consisting of four upwardly extending columns 128 which may be formed integral with the cap 122 at their bases, and joined to each other at their upper ends by a cross fitting 129 which may be adhesively secured to the tops of the columns.

A vent valve ball 130, which may be a small, stainless steel bearing ball, is retained in a recess 131 formed in a boss 132 formed integrally with a side of the cap 122. A narrow, ball-retaining strip 133 of suitable material is adhesively secured diametrically across the upper end of the ball enclosure 131 to prevent the escape of the vent ball therefrom. The bottom of the enclosure 131 is formed to seat the ball 130 thereon, and a vent passage 134 communicates from the bottom of the ball recess 131 with the atmosphere.

The device of Figs. 9 and 10, like the others of Figs. 1 to 9 inclusive, may be operated by an animal licking the ball 123 to raise it from its seat 124. Positive pressure of water within the cap 122, plus the weight of the vent valve ball 130 normally retains the vent valve ball 130 in seated, closed position. When, however, a negative pressure exists within the cap 122, the vent valve ball will be raised from its seat by the pressure of the atmosphere through the vent passage 134 to admit air into the cap and thus will prevent air lock and gurgling which otherwise might frighten an animal attempting to drink from the device.

The invention provides a simple, inexpensive and easily mounted drinking fountain for animals, and one in which the water is protected from contamination by dust particles and other matter settling therein. Although it is easily operated by an animal trained in its use, a device embodying the invention is not subject to sampling by every passing dog as is an open pan of water.

While I have illustrated and described a preferred embodiment of the present invention, it will be understood however, that various changes and modifications may be made in the details thereof without departing from the scope of the invention as set forth in the appended claims.

Having thus described the invention, what I claim as new and desire to protect by Letters Patent is defined in the following claims.

I claim:

1. A watering device for domestic animals comprising a water container, a mounting bracket on a side of said container, means for releasably attaching said bracket to a wall with the container in inverted position, a threaded neck portion on the lower end of the inverted container, an internally threaded cap of inverted conoid shape screwed onto the neck of said container, said cap having an outlet opening in its lower end, a valve seat surrounding the outlet opening in the cap, a valve ball having a specific gravity greater than water seated on said seat with its lower side exposed below the cap for elevation from its seat by an animal licking the ball, a vent valve support extending radially inwardly from a side of the cap and having a vent valve opening therethrough coaxially of the cap, a vent valve supported on said support, said vent valve comprising a valve stem of smaller diameter than the opening in said support mounted co-axially therein and terminating closely above the valve ball, a valve head on said valve stem seated on the upper end of said support marginally around the opening therein, said cap having a vent passage therein extending from said support opening to the atmosphere exteriorly of the cap, and means sealing the space between the valve stem and the wall of the opening in which the valve stem is mounted below the point at which the vent passage opens into said opening.

2. A watering device for domestic animals comprising a water container, a lower end portion of inverted truncated conoid shape on said container, said lower end portion having an outlet opening in its truncated lower end, a valve seat surrounding the outlet opening in the cap, a valve ball, having a specific gravity greater than water, seated on said seat with its lower side exposed below the outlet opening for elevation from its seat by an animal licking the ball, a vent valve support extending radially inwardly from a side of the container and having a vent valve opening therethrough co-axially of the conoid lower end portion thereof, a vent valve stem mounted co-axially in the vent valve opening and spaced from the wall surrounding said opening, said valve stem terminating closely above the valve ball, a valve head on said valve stem seated on said vent valve support marginally around the upper end of the vent valve opening therein, said support having a vent passage communicating from the vent valve opening therein to the atmosphere exteriorly of the container, and means sealing the space between the valve stem and the vent valve support below the point at which the vent passage opens into the vent valve opening.

3. A watering device for domestic animals comprising a water container having an opening in the lower end thereof, a cap of inverted conoid shape releasably secured in sealing relation over the opening in the lower end of the container, said cap having an outlet opening in its lower end, a valve seat surrounding the outlet opening in the cap, a valve ball, having a specific gravity greater than water, seated on said seat with its lower side exposed below the cap for elevation from its seat by an animal licking the ball, a vent valve support centrally within the cap and having a vent valve opening therethrough co-axially of the cap, a vent valve mounted in the vent valve opening, said vent valve comprising a valve stem of smaller diameter than the opening in said vent valve support disposed co-axially of the cap and terminating closely above the valve ball, a valve head on said valve stem seated on said support marginally around the upper end of the vent valve opening therein, said cap having a vent passage therein extending from the vent valve opening to the atmosphere exteriorly of the cap, and means sealing the space between the valve stem and the vent valve support at the lower end of the vent valve opening in said support.

4. A watering device for domestic animals comprising a water container with an opening at the lower end thereof, an inverted truncated conical cap mounted to seal the container opening, the cap having an outlet opening in the truncated lower end thereof, an outlet valve mounted in the cap outlet opening and extending below the cap for operation by an animal licking the valve, a vent valve mounted directly above the outlet valve, the vent valve being mounted over a passage communicating with the atmosphere, and a stem on the vent valve extending to a point directly above the outlet valve to open the vent valve upon operation of the outlet valve.

5. A watering device for domestic animals comprising an inverted water container, a threaded neck portion on the lower end of the container, an inverted truncated conical cap screwed onto the neck portion in sealing relation therewith, the cap having an outlet opening in the truncated lower end thereof, a disk interposed between the container neck portion and the cap and extending transversely across the end of the container neck portion, said disk having a non-concentric opening therein to pass water freely from the container into the cap, the disk opening being of lesser width than the diameter of a valve ball in the cap, said disk also having a central opening for a vent valve, an outlet valve ball mounted in the cap outlet opening and extending below the cap for operation by an animal licking the valve, a vent valve mounted directly above the outlet valve, and extending through a central opening in the disk, the vent valve being mounted over a vent passage communicating with the atmosphere, means urging the vent valve to close the vent passage, and a stem on the vent valve extending to a point directly above the outlet valve to open the vent valve upon operation of the outlet valve.

6. A watering device for domestic animals comprising a water container, a threaded neck portion on the lower end of the container, an inverted truncated conical cap mounted on the neck in sealing relation with the container, the cap having an outlet opening in the truncated lower end thereof, an outlet valve ball mounted in the cap outlet opening and extending below the cap for operation by an animal licking the valve, a vent valve mounted directly above the outlet valve, the vent valve being mounted over a passage communicating from the interior of the container to the atmosphere, a stem on the vent valve extending to a point directly above the outlet valve to open the vent valve upon operation of the outlet valve, and a portion on the lower end of the stem formed to overlie the outlet valve ball and shaped to conform substantially thereto.

7. A watering device for domestic animals comprising a water container, a threaded neck portion on the lower end of the container, an inverted truncated conical threaded cap screwed onto the container neck in sealing relation with the container, the cap having an outlet opening in the truncated lower end thereof, a rigid, perforated, ball-retaining disk fitted with the cap and extending transversely across the container neck, the disk and the cap having vent passages therein located for alignment with each other in a predetermined rotative position of the disk in the cap, key means securing the disk in such predetermined position in the cap, an outlet valve ball mounted in the cap outlet opening and extending below the cap for operation by an animal licking the ball, the ball being of greater diameter than the width of the perforations in said disk, a vent valve mounted directly above the outlet valve, the vent valve being mounted over a passage communicating with the atmosphere, and a stem on the vent valve extending to a point directly above the outlet valve to open the vent valve upon operation of the outlet valve.

8. A watering device for domestic animals comprising a water container, a threaded neck portion on the lower end of the container, an inverted truncated conical threaded cap screwed onto the container neck in sealing relation with the container, the cap having an outlet opening in the truncated lower end thereof, a rigid, vent valve body portion extending inwardly from a side of the cap, said valve body having a vent passage therein communicating with the atmosphere exteriorly of the cap, a valve member mounted in the cap and having a portion thereof overlying the inner end of the vent passage, means urging the valve member toward sealing condition over the inner end of the vent passage, an outlet valve ball mounted in the cap outlet opening and extending below the cap for operation by an animal licking the ball, and a stem on the vent valve extending to a point directly above the outlet valve ball to open the vent valve upon operation of the outlet valve.

9. A watering device for domestic animals comprising a water container, a threaded neck portion on the lower end of the container, an inverted truncated conical threaded cap screwed onto the container neck in sealing relation with the container, the cap having an outlet opening in the truncated lower end thereof, an outlet valve ball mounted in the cap outlet opening and extending below the cap for operation by an animal licking the valve, a radial wall member mounted within the cap and terminating short of the conic axis of the cap, a vent valve slidably mounted on the inner edge of said wall directly above the outlet valve, the upper end of said vent valve being offset laterally in overlying relation with the inner end of a passage through the wall and the cap communicating with the atmosphere, and a stem on the vent valve extending to a point directly above the outlet valve to open the vent valve upon operation of the outlet valve.

10. A watering device for domestic animals comprising a water container having an opening in the lower end thereof, an inverted truncated conical cap mounted in base-up condition beneath the container opening, the cap having an outlet opening in the truncated lower end thereof, means sealing the cap to the container, an outlet valve ball mounted in the cap outlet opening and extending below the cap for operation by an animal licking the valve, a normally closed vent valve mounted in the cap above the level of the outlet valve, the vent valve being mounted over a passage communicating with the atmosphere, and means retaining the outlet valve ball within the cap upon inversion of the cap to base-down condition.

11. A watering device for domestic animals comprising a water container having an opening in the lower end thereof, an inverted truncated conical cap mounted in base-up condition beneath the container opening, the cap having an outlet opening in the truncated lower end thereof, means sealing the cap to the container, an outlet valve ball mounted in the cap outlet opening and extending below the cap for operation by an animal licking the valve, a normally closed vent valve mounted in the cap above the level of the outlet valve, the vent valve being mounted over a passage communicating with the atmosphere, and an enclosing cage secured to the cap and spanning the outlet opening in the cap in upwardly spaced relation to the outlet valve ball to retain the outlet valve ball within the cap upon inversion of the cap to base-down condition.

References Cited in the file of this patent

UNITED STATES PATENTS

| | | |
|---|---|---|
| 1,454,284 | Holmes | May 8, 1923 |
| 2,678,630 | Frederiksen | May 18, 1954 |

FOREIGN PATENTS

| | | |
|---|---|---|
| 26,012 of 1930 | Australia | Apr. 3, 1930 |
| 641,507 | Great Britain | Aug. 16, 1950 |